Figure 1:
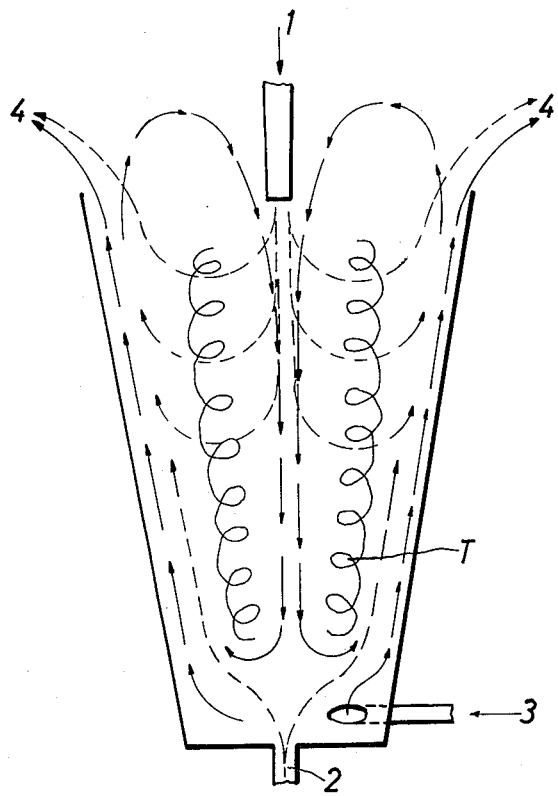
Figure 2:
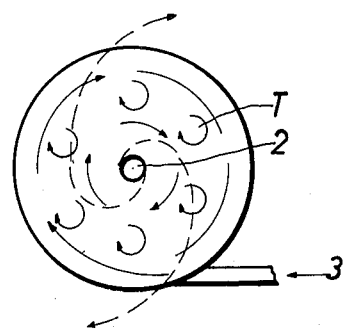

Feb. 13, 1962 W. JOSEPH ET AL 3,020,646
PROCESS FOR DRYING FILLERS OF SILICA OR SILICATE
Filed Dec. 18, 1958

INVENTORS:
WERNER JOSEPH, GUSTAV KAULE, ERNST PODSCHUS.
BY Oscar H Spencer
ATTORNEY

3,020,646
PROCESS FOR DRYING FILLERS OF SILICA OR SILICATE

Werner Joseph, Leverkusen, Gustav Kaule, Opladen, and Ernst Podschus, Leverkusen-Bayerwerk, Germany, assignors to Farbenfabriken Bayer Aktiengesellschaft, Leverkusen, Germany, a corporation of Germany
Filed Dec. 18, 1958, Ser. No. 781,253
Claims priority, application Germany Dec. 21, 1957
11 Claims. (Cl. 34—10)

In the production of fillers of silica and silicates (particularly in the production of siliceous pigments suitable for reinforcing rubber or opacifying paper) by precipitation from an aqueous medium and filtration of the resulting slurry, filter cakes are obtained, after removal of the solution, having a high water content, i.e., up to about 60–90 percent. These filter cakes are dried in drum or multiple-tier driers, the dry material being obtained in lumps. Before the fillers are used, they must therefore be finely ground.

According to this invention, a new process has been provided whereby such siliceous materials which contain free and/or bound water may be readily treated to remove water therefrom and to produce directly and without grinding a finely-divided dried product. This may be conducted effectively by establishing a circularly flowing or whirling upwardly rising stream of hot gas, preferably in the form of a vortex, and introducing the silica or silicate-water mixture into the central area of this stream. By this means, the silica or silicate to be dried is rapidly dispersed throughout the stream and is dried while being swept upwardly therewith and is carried out of the drying area with the hot gases which are withdrawn from an upper portion of the drying zone or vortex.

When filter cakes are subjected to treatment, the process can be effectively performed by converting the filter cake or like mixture containing water to a pasty or fluid consistency by applying shearing forces and drying it in atomized form in a current of hot gases so highly turbulent that drier outputs of at least 100 (preferably 500–10,000) kilograms of moisture per hour per cubic meter of drying space are attained. In this way, the filler is obtained in a voluminous form so that fine grinding can be dispensed with. If, however, fine grinding is subsequently carried out, especially loose products are obtained which are comparatively more voluminous and more dispersible than the products obtained by previous methods.

This surprising technical progress is presumably based on the fact that filter cakes of silica or silicate, on account of their particular rheological properties, are convertible into the consistency of a sprayable paste or fluid mass by shearing forces and that the drying takes place in a very fine distribution in the current of the highly turbulent hot gases. Suitable for the shearing treatment of the viscous filter cakes of the filler are, for example, kneading worms which, at the same time, may serve to deliver the paste to the atomizing nozzle. For increase of the pressure, there may be interposed behind the worm a pump, for example, a tube pump or gear pump. The spraying may be carried out in conventional single or binary nozzles.

According to one mode of carrying the invention into effect, the hot gases are conducted as turbulence-producing medium into the drying chamber, preferably widening in the direction of the main flow, at the end of smallest diameter, with a twist or turning movement, at a temperature of 200 to 1000° C. and at a rate of at least 15 meters per second, preferably 50 to 150 meters per second, and the substance to be dried axially forced into the occurring back flow in the vicinity of the axis. Both components leave the drying chamber together at the end having the largest diameter, whereupon the solids are separated and discharged from the gas current in subsequent conventional apparatus.

According to another mode of operation, subsequent combustion is effected in the zone of turbulence by introducing a combustible and/or oxygen-containing gas into the drying chamber in the vicinity of the axis, the particles to be dried being locally subjected to gas temperatures which are above the temperature of the flow passing in the vicinity of the wall.

The moisture content of the filter cakes of silica fillers or silicate or like siliceous pigments or fillers is higher the smaller are the primary particles. With comparatively coarse, pigment-like white products, the water contents lie between about 60 to 80 percent. With smaller fillers, with specific surfaces of about 100 square meters per gram, the filter cakes have a more or less transparent glassy appearance and water contents between 80 and 90 percent. The flow of these filter cakes is surprising because they are present in the form of solid lumps which are transformed only on kneading into the consistency of pastes. With increasing shearing force, the deformation speed rises only slowly at first, but eventually very steeply. The descending curve representing the shearing force and deformation speed deviates strongly from the ascending curve; the filler pastes are, therefore, markedly thixotropic according to Henry Green, "Industrial Rheology and Rheological Structures," published by John Wiley Sons, Inc., New York, and Chapman & Hall Ltd., London.

The filter cakes remain also thinly liquid for some time after the shearing force has ceased, i.e., the longer, the poorer their salt content. While it is possible to liquify a very pure, nearly salt- and base-free filter cake of a silicic acid filler by intense shearing, the thin paste then remaining liquid almost indefinitely so that the thixotropic tendency to gel is practically avoided, this cannot be attained with filter cakes of silicic acid and silicates containing 1 to 2 percent of salt. Especially, calcium silicate filter cakes already solidify after a short time (after a few seconds). They cannot, therefore, be treated as liquids and cannot be directed to a spray nozzle, for example. With prolonged shearing, for example, with the aid of a worm, they may, however, be conducted without dilution with water and may be atomized through conventional nozzles.

A suitable operational embodiment of the apparatus for drying in a highly turbulent current is illustrated in the accompanying drawing.

The suspension or paste to be dried is sprayed at 1 or 2 into the axially symmetrical drying chamber which widens in the direction of the axis from 2 to 1. The drying gas is introduced tangentially at 3 at the end having the smallest diameter at a speed of at least 15 meters per second, preferably 50 to 150 meters per second, and at a temperature preferably of more than 500° C., and leaves the space at 4 tangentially and in the same direction of rotation together with the dry material. Due to the centrifugal force, the flow from 3 to 4 adheres to the walls while near the axis a back-flow occurs having an axial component from 1 to 2. On account of the turbulence at the free interfaces, there is formed between these two flows having opposed axial components a stable annular rotational field T. The suspensions introduced in a finely divided form at 1 or 2 are seized by the back-flow and accelerated in a circumferential direction. By centrifugal forces thus formed, the individual particles are moved through the rotational zone T where the main drying operation takes place and are conducted into the externally adhering flow by means of which they are discharged from the chamber and deposited in the subsequent plant. The hot gases required for the drying are advantageously generated by combustion of a gaseous or liquid fuel, such as methane, carbon monoxide or hydrocarbon oil, with air in a preliminary heating chamber. For the adjustment of a definite oxygen content in the hot gas, spent gas or oxygen or an excess of air can be admixed. Alternatively, the air may be injected tangentially and the fuel axially into the lower portion of the drying chamber and the hot vortex contemplated here thus produced.

The following example is given for the purpose of illustrating the invention:

*Example I*

A washed and very finely divided filter cake, obtained by filtration of a slurry produced by reacting together a solution of silicate and acid according to French patent specification No. 1,064,230, having a mean $SiO_2$ primary particle diameter of 15 millimicrons corresponding to a specific surface of 180 square meters per gram, a water content of 87 percent, and a salt content of less than 2 percent, is introduced with the aid of a feeding device into a 2-meter long enamelled double worm (5 centimeters clearance each) running at 150 revolutions per minute. On account of the shearing forces in the worm, the lumpy filter cake is kneaded to give a flowable and pumpable thixotropic paste which is discharged at the end of the worm after a duration of 1–2 minutes at a pressure of 0.2–0.3 atmosphere (gauge). In order to increase the pressure, a tube pump is interposed behind the worm which delivers the paste to the binary nozzle located at the upper end of the heat-insulated drying chamber and through which it is sprayed directly into the hot combustion gases at 800–900° C. in the form of very fine droplets with the aid of compressed air. The hot gases are generated by combustion of 15 normal cubic meters per hour of coal gas having a calorific power of 4000 kilogram calories per cubic meter with the admixture of about 130 normal cubic meters per hour of air in the combustion chamber placed before the drying chamber and tangentially introduced from below at a rate of 70 meters per second into the conical drying chamber.

The brief stay, less than 1 second, of the droplets in the turbulent current of hot gas is sufficient to remove the moisture from the finely divided silicic acid before it reaches the walls of the drying chamber. The dry and finely divided silicic acid particles, together with the hot gases, leave tangentially the upper end of the drying chamber at about 200–250° C. and are deposited in a subsequent cyclone. The drying capacity of the apparatus, whose spraying chamber is about 15 cubic decimeters, is about 70 kilograms of $SiO_2$ filter cake per hour at a temperature of the entering hot gases of 900° C. and a discharge temperature of 200–250° C., corresponding to a drying capacity of 60 kilograms of moisture per hour or a specific drying chamber effect of 400 kilograms of moisture per hour and cubic meter.

The silicic acid filler dried in this manner is, in accordance with the sedimentation volume of 27 milliliters (2 grams of filler in 98 grams of toluene after shaking), essentially more loose and voluminous than the comparative sample obtained in conventional drying whose sedimentation volume is only 15 milliliters, after the same grinding in a pin mill. Without grinding, the silicic acid filler, dried in a turbulent current of hot gases, yields a sedimentation volume of 18 milliliters.

The above process is effective in removing water rapidly from silica or siliceous slurries containing 50 to 90 percent by weight of free water (water which can be driven off by heating at 100–110° C. for 24 hours). However, it is not limited thereto. Thus, the process may be applied to the removal of bound water from silica or siliceous pigment.

The advantages which accrue by removal of bound water from siliceous pigment has been emphasized by Pechukas in United States Letters Patent No. 2,805,956. However, very long times are required to achieve the desired degree of bound water removal (see Example XI of this patent).

The bound water can be removed readily by the present process by maintaining the temperature of the exit gases high enough, for example, in the range of 350 to 900° C. Silica slurry or filter cake may be dried directly in a single stage to produce siliceous pigment containing about 14 to 85 moles of $SiO_2$ per mole of bound water, by this means. Alternatively, the process may be performed in a plurality of stages by first drying the filter cake, as in the above example, to produce a dry product which contains bound water but little or no free water and then feeding this material into a second drying chamber of the same type to remove the bound water. In this event, the temperature of the exit suspension in the first stage normally is held at about 150 to 350° C. while the temperature of the suspension exiting from the second stage is held at about 400 to 900° C. It is of advantage to carry out the stage-processes by the counter-current system, using the 400–900° C. hot gases of the second drying stage for the removal of free water from the filter cake in the first drying stage, thereby reacting a high thermal efficiency of the total drying process.

*Example II*

A 0.25 molar sodium silicate solution (referred to $Na_2O$) having a $Na_2O:SiO_2$ ratio of 1:3.3 is added with vigorous stirring to a 0.25 molar $CaCl_2$ solution so as to obtain a $CaCl_2$ excess of about 10%. The calcium silicate formed is filtered off and washed. A filter cake of a water content of about 85% is obtained. This filter cake is introduced into the double worm described in Example 1, and in the same way as the silicic acid filler of Example 1 delivered to the binary nozzle by means of a tube pump and sprayed into the drying chamber through which a turbulent current of hot combustion gases is passed as described in Example 1. The resulting calcium silicate filler has a specific surface area of 59 square meters per gram, a water content of 1% (determined at 110° C.) and a $CO_2$ content of 2.02%. The calcium silicate filler which is dried according to the invention in a state of fine subdivision within an extremely brief period of time is essentially more voluminous than a control sample which is obtained in lumps by drying in a multiple-tier drier. In contrast to the operation in a multiple-tier drier, grinding of the filler obtained according to the invention is not necessary. A surprising feature of the calcium silicate according to the invention is the low $CO_2$-content of 2.02%, corresponding to 4.6% of $CaCO_3$, despite the direct drying with combustion gases in fine subdivision. The filler obtained in the multiple-tier drier by direct heating with combustion gases has on an average 6% of $CO_2$ corresponding to about 13.5% of $CaCO_3$. This high $CaCO_3$ content is detrimental e.g. to the use as reinforcing filler, since the calcium carbonate forms relatively large crystallites.

*Example III*

By continuously running a 0.8 molar $CaCl_2$ solution and a 0.8 molar sodium silicate solution of a $Na_2O:SiO_2$ ratio of 1:3.3 in stoichiometrical proportion into a stirrer vessel a calcium silicate of relatively low specific surface is precipitated. After filtering and washing a filter cake of a water content of about 75% is obtained. The filter cake is introduced into a funnel of about 30 litres capacity, which opens into a tube of 20 mm. diameter. The tube is extended into the intake pipe of a gear pump, the connection being sealed with a rubber sleeve. By means of a mechanical oscillator the funnel is set into a vertical oscillations of an amplitude of 4 millimetres and a frequency of 50 cycles per second. After a few minutes the filter cake has assumed a pasty consistency and, on account of the liquefaction in the vicinity of the wall, moved under its own weight into the gear pump which delivers the paste to the spray nozzle. The spray-drying in the current of the hot turbulent combustion gases is effected in the manner described in Example I at an extraordinarily high drying capacity. The resulting dry calcium silicate filler has a specific surface of 29 square meters per gram and a $CO_2$ content of only 1.92%. The filler can be used without grinding e.g. as a white pigment to increase the brightness and opacity of paper. An advantage over the customary drying and grinding in pin mills is i.e. the low $CO_2$ content of the product and its low tendency of dusting in processing.

Although the present invention has been described with reference to the specific details of certain embodiments thereof, it is not intended that such details shall be regarded as limitations upon the scope of the invention except insofar as included in the accompanying claims.

What is claimed:

1. A method of removing water from a siliceous material which comprises establishing a vortex of hot inert gas heated to drying temperature, said vortex having an entry end and an outlet end for said gas and a central area in which there is flow of gas toward the entry end surrounded by an external area in which there is circular flow of hot gas around the central area and toward the outlet end, introducing the siliceous material into contact with the hot gas by feeding it into the central area and thereby suspending the siliceous material in said gas, and removing the resulting suspension from said outlet end.

2. The method of claim 1 wherein the temperature of the gas in the suspension removed from the outlet end of the vortex is held at 150 to 350° C.

3. The method of claim 1 wherein the temperature of the gas in the suspension removed from the outlet end of the vortex is held at 400 to 900° C.

4. The method of claim 1 wherein the vortex is conical, the hot gases enter into the vortex at the smallest diameter thereof, and the suspension is removed from the vortex at the end of the heating zone having the largest diameter thereof.

5. The method of claim 1 wherein the vortex is established by introducing a stream of gas, at a temperature of 200 to 1000° C. into the lower portion of a conical heating zone adjacent the end thereof of smaller diameter, in a direction tangentially of the zone and at a velocity of at least 15 meters per second.

6. The method of claim 1 wherein the siliceous material is a finely divided, precipitated siliceous pigment.

7. A method of removing water from a siliceous pigment-water mixture which comprises subjecting the composition to shear until the fluidity of the composition has increased, establishing a vortex of hot inert gas heated to drying temperature, said vortex having an entry end and an outlet end for said gas and a central area in which there is flow of gas toward the entry end surrounded by an external area in which there is circular flow of hot gas around the central area and toward the outlet end, introducing the mixture after increase of fluidity thereof into contact with the hot gas by feeding it into the central area and thereby suspending the mixture in said gas, and removing the resulting suspension from said outlet end.

8. The method of claim 1 wherein the siliceous pigment-water mixture is a filter cake produced by filtration of an aqueous slurry of precipitated siliceous pigment.

9. The method of claim 1 wherein the temperature of the gas in the suspension removed from the outlet end of the vortex is held at 150 to 350° C.

10. The method of claim 1 wherein the vortex is conical, the hot gases enter into the vortex at the smallest diameter thereof, and the suspension is removed from the vortex at the end of the heating zone having the largest diameter thereof.

11. The method of claim 1 wherein the vortex is established by introducing a stream of gas, at a temperature of 200 to 1000° C. into the lower portion of a conical heating zone adjacent the end thereof of smaller diameter, in a direction tangentially of the zone and at a velocity of at least 15 meters per second.

References Cited in the file of this patent

UNITED STATES PATENTS

| | | |
|---|---|---|
| 2,316,207 | Winter | Apr. 13, 1943 |
| 2,435,927 | Manning | Feb. 10, 1948 |
| 2,615,199 | Fuller | Oct. 28, 1952 |
| 2,696,677 | Molenaar | Dec. 14, 1954 |
| 2,863,727 | Thornhill et al. | Dec. 9, 1958 |

FOREIGN PATENTS

| | | |
|---|---|---|
| 285,038 | Great Britain | May 9, 1929 |